Feb. 7, 1961      C. W. GRANT      2,970,354
FASTENING DEVICE FOR A TRIM MOLDING OR THE LIKE
Filed April 21, 1958
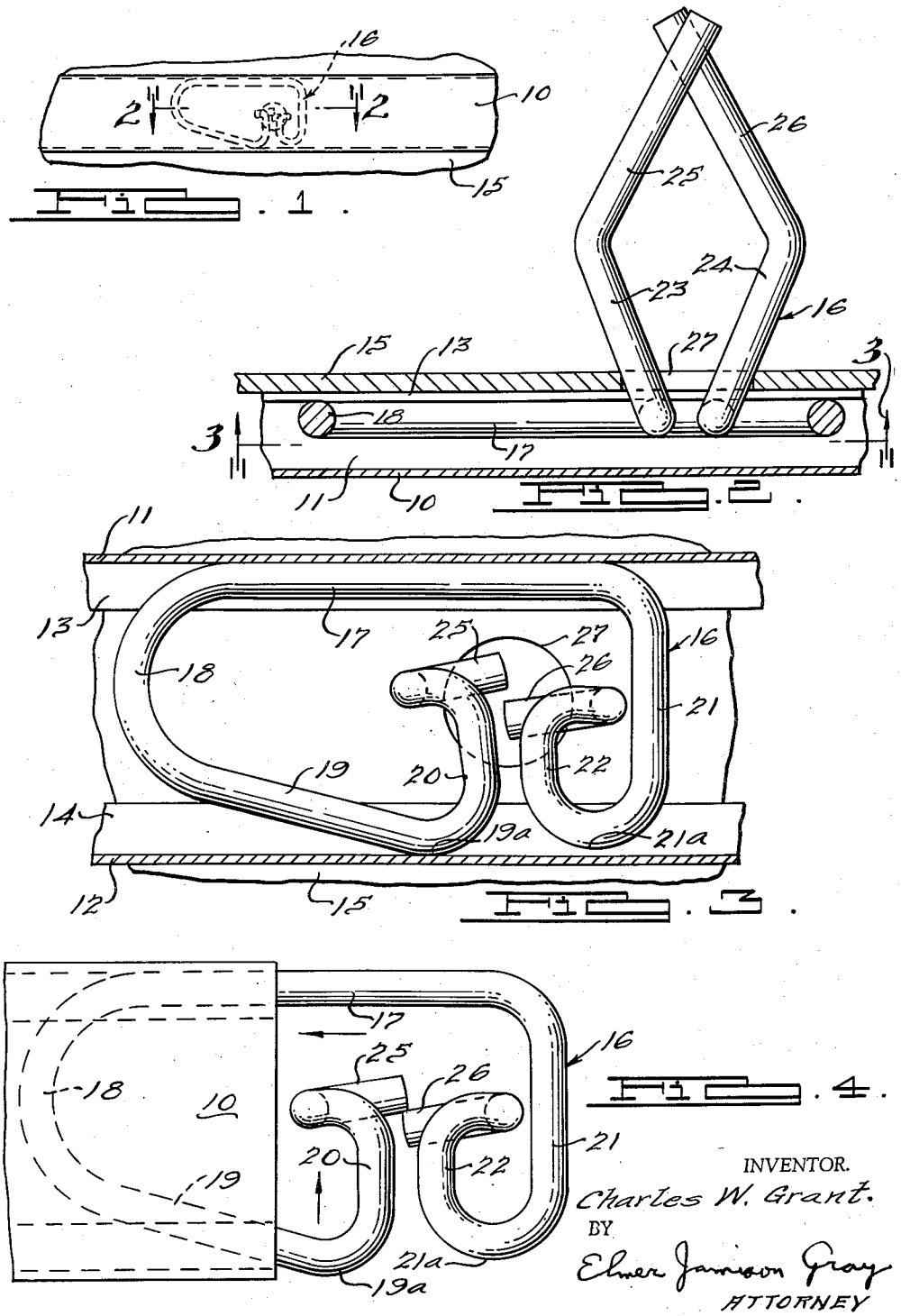
INVENTOR.
Charles W. Grant.
BY
Elmer Jamison Gray
ATTORNEY United States Patent Office 2,970,354
Patented Feb. 7, 1961

2,970,354

FASTENING DEVICE FOR A TRIM MOLDING OR THE LIKE

Charles W. Grant, Grosse Pointe Shores, Mich., assignor to Fourslides, Inc., Detroit, Mich., a corporation of Michigan Filed Apr. 21, 1958, Ser. No. 729,810

6 Claims. (Cl. 24—73)

This invention relates to fastening means for securing trim moldings and the like to body panelling, the invention being particularly applicable to one-piece wire formed fasteners adapted to be inserted into the channel of a hollow molding, such fasteners each having relatively yieldable reversely bent holding members adapted to be forced through an aperture in an automobile or other body panel thereby securing the molding in firm engagement therewith.

A serious problem has been encountered in connection with the attachment of trim or ornamental moldings to the outer faces of automobile body panels. In common practice each molding is reversely bent along opposite edges to provide spaced channels to receive in interlocking relation the opposite sides of a U-shaped wire fastener base portion from within which the reversely bent holding members extend perpendicularly with respect to the base of the fastener. Due to variations in moldings, consequent principally to allowable production tolerances, the spacing of the channels thereof vary to such an extent as to frequently render the base portions of the wire fasteners loose therein. As a consequence, the fasteners, after being initially assembled with the molding in predetermined positions, become displaced along the molding and hence disposed out of proper relation to the apertures in the body panel through which the fastener holding members must be forced. As a result, considerable delay results and time is involved frequently in assembling moldings on automobile bodies especially where large scale production is scheduled.

In accordance with the present invention and as distinguished from inadequate attempts to meet the foregoing problems there is provided a wire fastener of improved construction having a molding attaching base adapted by spring action to hold the fastener in proper position on the molding. In accordance with the illustrated embodiment the attaching base of the wire fastener is formed along one side with a main rectilinear molding engaging side or base member adapted to have operative engagement throughout its length with the back wall of one channel edge of the molding. From opposite ends of this main molding engaging member the wire is bent to form transverse end sections and a pair of molding engaging members coplanar with the main molding engaging member and extending in generally converging relation toward each other. By virtue of this construction the transverse end sections and the molding engaging members span the spaced channel edges of the molding. From these molding engaging members there are formed inward reversely bent portions or loop sections adapted to lie between the spaced channel edges of the molding, the wire at the ends of these sections being bent at right angles to form the reversely bent holding members or fastener portions.

In accordance with the invention one transverse end section of the wire extending from one end of the rectilinear base member is formed on an arc of substantial radius from which a relatively long side or base member extends in diverging relation to the main side or base member and terminates in a curved molding engaging member spaced further from the main side member than the adjacent molding engaging member. In conjunction with the relatively large arc or loop end section the elongate side member forms a spring arm adapted to be deflected inwardly when the fastener is forced into the molding, thereby exerting expanding pressure effective to firmly and frictionally hold the fastener in position irrespective of whether any variation in the spacing of the molding channels would result in loose or non-engagement of the adjacent base portion of the fastener.

Other objects of this invention will appear in the following description and appended claims, reference being had to the accompanying drawings forming a part of this specification wherein like reference characters designate corresponding parts in the several views.

Fig. 1 is a fragmentary view of a molding attached to a body panel in accordance with the present invention.

Fig. 2 is an enlarged fragmentary sectional view taken through lines 2—2 of Fig. 1 looking in the direction of the arrows.

Fig. 3 is a sectional view taken through lines 3—3 of Fig. 2 looking in the direction of the arrows.

Fig. 4 is a view in part similar to Fig. 3 illustrating the manner in which the trim fastener is installed in the molding.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated a channel shaped or hollow molding having an outer curved wall 10. The molding is reversely bent along opposite edges 11 and 12 to provide inturned flanges 13 and 14 forming spaced channels to receive in interlocking relation the opposite sides of the wire fasteners. These inturned flanges are adapted to firmly engage the automobile body panel 15 when the molding is secured to the panel by a series of fastener devices.

The one-piece wire fastener 16 is provided with an elongate rectilinear main side or base member 17, the wire being bent at one end of this base member to form a generally arcuate loop or end section 18 formed on an arc of substantially large radius. This arcuate portion at one end of the fastener is joined to a relatively long side or base member 19 forming a spring arm extending in diverging relation to the main base member 17. The wire at the end of the spring arm 19 is formed with a curved molding engaging member 19a and from this locality the wire is bent inwardly in the direction of the base member 17 to provide an inward reversely bent loop section 20.

The wire at the opposite end of the rectilinear base member 17 is preferably bent substantially at right angles to form a rectilinear end member 21. This member terminates in a curved or arcuate molding engaging end 21a whence the wire is bent inwardly in the direction of the base member 19 to form an inward reversely bent loop section 22.

At the inner ends of the loop sections 20 and 22 the wire is bent to form fastener portions disposed substantially normal to the plane of the base. These fastener portions comprise divergently extending holding members 23, 24 and convergently extending guide members 25, 26. When the molding is assembled on the body panel the fastener portions of each fastener are forced through an aperture 27 in the panel thereby holding the molding firmly in position.

It will be seen that the molding engaging member 19a formed at the end of the spring arm 19 is spaced further from the base member 17 than the molding engaging member 21a. As illustrated in Figs. 3 and 4, the spacing of the edges 11 and 12 of the fastener receiving channels, due to variations in the moldings consequent to production tolerances, is such as to prevent engagement of the arcuate portion 21a with the edge 12 of the molding. However, when the fastener is inserted through the end of the molding channel, as illustrated in Fig. 4, the curved molding engaging member 19a will engage the edge 12 of the molding and together with the spring arm 19 will be deflected inwardly in the direction of the arrow when the fastener is forced into the molding. This deflection of the spring arm 19 will cause the same, when the fastener is assembled as illustrated in Fig. 3, to exert expanding pressure effective in conjunction with the base member 17 to hold the fastener in firm frictional engagement with the edges 11 and 12 of the molding regardless of loose or non-engagement of the adjacent portion 21a of the fastener.

I claim:

1. A fastener formed from a single length of wire and having a base adapted to be inserted into the underlying opposed channel edges of a molding or the like, said base comprising a main rectilinear molding engaging base member having arcuate bends at opposite ends to provide transverse members, one transverse member being mainly rectilinear and the wire at the end thereof having an angularly bent base portion extending in a direction toward said main base member and providing a curved molding engaging member, the arcuate bend of the other transverse member being formed on an arc of substantial radius and being joined to a relatively long rectilinear wire section having at the end thereof an angularly bent portion extending in a direction toward said main base member and providing a second curved molding engaging member adjacent said first curved member, said angularly bent portions terminating in fastener members disposed substantially normal to said base, said rectilinear wire section extending in diverging relation to the main base member and having its molding engaging member spaced further therefrom than the adjacent curved molding engaging member.

2. A one-piece fastener having a base adapted to be attached to a molding or the like, said base comprising a main elongate rectilinear base member joined at opposite ends thereof to transverse end sections, one thereof terminating in a relatively long base section extending in a direction toward the other end section, said sections terminating in inwardly bent portions forming adjacent curved molding engaging members, said inwardly bent portions extending in a direction toward the main base member and terminating in reversely bent fastener portions disposed substantially normal to the plane of the base, said relatively long base section extending in diverging relation to the main base member and having its terminal molding engaging member spaced further from said main base member than the adjacent molding engaging member.

3. A one-piece fastener having a base adapted to be attached to a molding or the like, said base comprising a main elongate rectilinear base member joined at opposite ends thereof to transverse end sections, one thereof being formed on an arc of substantial radius and terminating in a relatively long base section extending in a direction toward the other end section, the other end section being mainly rectilinear, said sections terminating in inwardly bent portions forming adjacent curved molding engaging members, said inwardly bent portions extending in a direction toward the main base member and terminating in reversely bent fastener portions disposed substantially normal to the plane of the base, said relatively long base section extending in diverging relation to the main base member and having its terminal molding engaging member spaced further from said main base member than the adjacent molding engaging member.

4. A one-piece fastener having a base adapted to be attached to a molding or the like, said base comprising a main elongate rectilinear base member joined at opposite ends thereof to transverse end sections, one thereof being curved and terminating in a relatively long mainly rectilinear base section extending in a direction toward the other end section, said sections terminating in inwardly bent portions forming adjacent curved molding engaging members, said inwardly bent portions extending in a direction toward the main base member and terminating in reversely bent fastener portions disposed substantially normal to the plane of the base, said relatively long base section extending in diverging relation to the main base member and having its molding engaging member projecting further from the base member than the adjacent curved molding engaging member.

5. A fastener formed from a single length of wire and having a base adapted to be inserted into the underlying opposed channel edges of a molding or the like, said base comprising a main rectilinear molding engaging base member having arcuate bends at opposite ends to provide transverse members, the wire at the end of one transverse member being reversely bent to provide a curved molding engaging member and an angularly bent portion extending from said molding engaging member in a direction toward said main base member, the wire of the other transverse member being formed on an arc of substantial radius and joined to a relatively long substantially rectilinear wire section extending in diverging relation to the main base member and terminating in a second curved molding engaging member spaced from and substantially coplanar with said first named curved molding engaging member and spaced further from said main base member than said first named curved molding engaging member, said second molding engaging member having an angularly bent portion extending in a direction toward said main base member, said angularly bent portions terminating in fastener members extending angularly therefrom.

6. A fastener formed from a single length of wire and having a base adapted to be inserted into the underlying opposed channel edges of a molding or the like, said base comprising a main rectilinear molding engaging base member having arcuate bends at opposite ends to provide transverse members, the wire at the end of one transverse member being reversely bent to provide a curved molding engaging member and an angularly bent portion extending from said molding engaging member in a direction toward said main base member, the wire of the other transverse member being formed on an arc of substantial radius and joined to a relatively long substantially rectilinear wire section extending in diverging relation to the main base member and terminating in a second curved molding engaging member spaced from and substantially coplanar with said first named curved molding engaging member and spaced further from said main base member than said first named curved molding engaging member, said second molding engaging member having an angularly bent portion extending in a direction toward said main base member, said angularly bent portions terminating in fastener members disposed substantially normal to said base and located materially closer to said one transverse member than to said other transverse member.

References Cited in the file of this patent

UNITED STATES PATENTS

| 2,197,590 | Place | Apr. 16, 1940 |
| 2,254,311 | Place | Sept. 2, 1941 |
| 2,571,364 | Hosking | Oct. 16, 1951 |